Nov. 24, 1942. E. PETERSON 2,302,799
LIQUID DISTRIBUTING DEVICE
Filed May 22, 1939
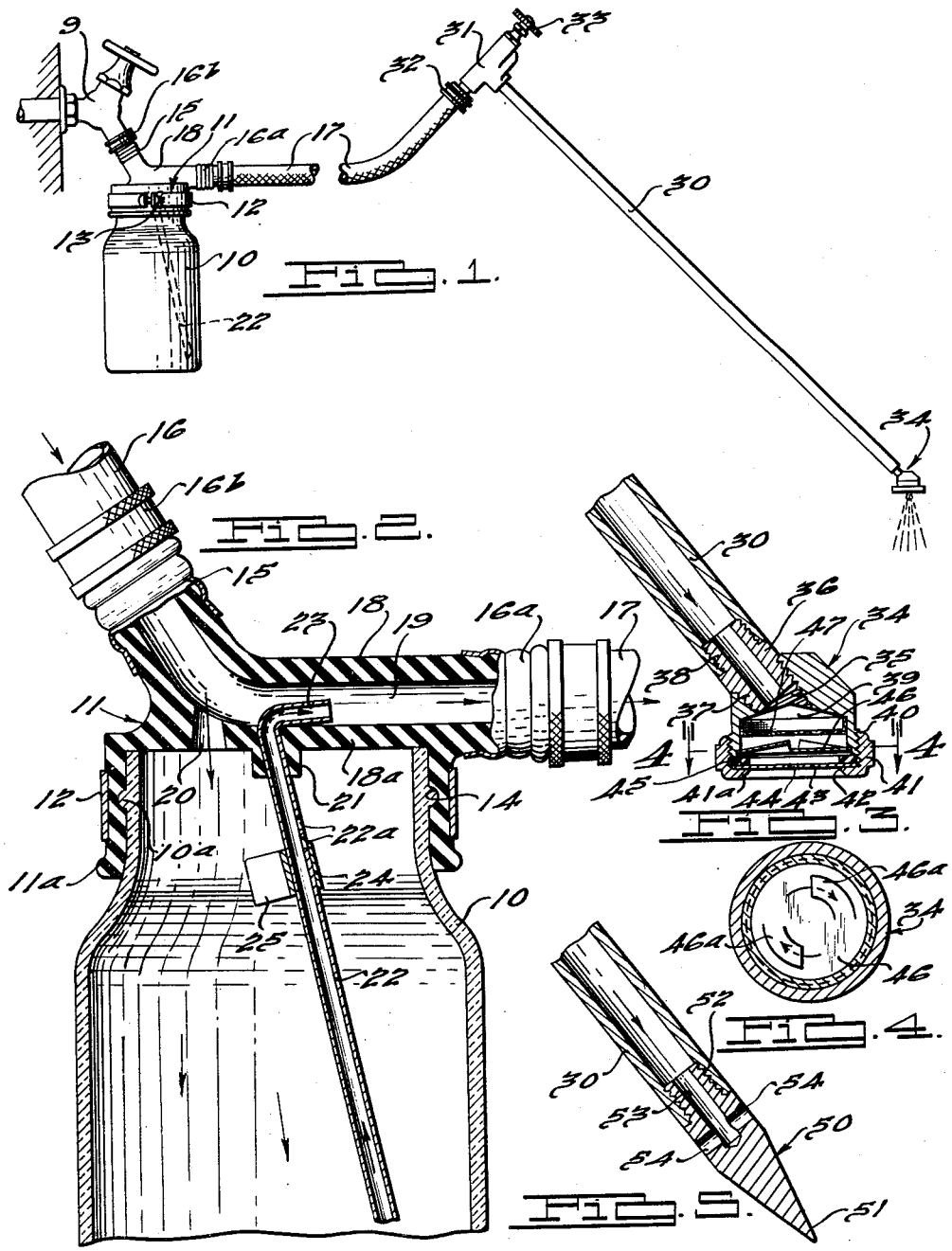
INVENTOR
Edwin Peterson
BY
Pike, Calmer & Gray
ATTORNEYS Patented Nov. 24, 1942

2,302,799

UNITED STATES PATENT OFFICE 2,302,799

LIQUID DISTRIBUTING DEVICE

Edwin Peterson, Dearborn, Mich.

Application May 22, 1939, Serial No. 274,887

6 Claims. (Cl. 299—84)

This invention relates to liquid distributing devices and more particularly to fertilizing solution spraying or distributing devices.

An object of the invention is the provision of an improved apparatus or device of the foregoing character wherein a fertilizer solution is commingled with a water flow for the purposes of supplying the fertilizer to a lawn, flower or vegetable garden during the watering thereof or to the roots of vegetables, flowers or the like at points beneath the top surface of the ground with a minimum of effort, and with the assurance of eliminating the chances of having harmful results in that a proper mixture of both the water and solution of fertilizing medium of the required constituency will be assured. It will be understood that the apparatus is adapted for use in distributing all sorts of insecticide or other spraying solutions as well as fertilizing solutions.

Another object of the invention is to create the spray solution by discharging fertilizing liquid or other spray liquid into a moving stream of water by means of suction or vacuum which is created by the movement of the water stream, obtaining, in effect, a Venturi action which is utilized and controlled to provide a predetermined amount of the fertilizing or other spray liquid in the conveying water stream.

Another object of the present invention is to provide a liquid distributing device of the foregoing character in which the glass jar or other receptacle is provided with a flexible closure or cap capable of expanding sufficiently to relieve any excessive fluid pressures within the jar, thus eliminating a considerable amount of breakage of such jars previously experienced in devices of this type provided with a rigid closure or cap.

A further object of the invention is to provide a liquid distributing device having a glass jar or other receptacle with a molded resilient rubber distributing head having expansion characteristics and in which the cap is securely but removably clamped or attached to the jar neck.

Another object of the invention is to provide a liquid distributing device having a spraying lance which serves as a handle permitting objects to be reached and sprayed which would otherwise be inaccessible.

Another object of the invention is to provide a liquid distributing device having a spraying lance to which may be attached interchangeably spray heads or nozzles of various types.

A still further object of the invention is to provide a spraying or liquid distributing device of the foregoing character having an improved nozzle or spray head capable of penetrating the ground to distribute the liquid at points below the surface of the ground.

Another object of the invention is to provide a relatively simple and inexpensive device of the foregoing character which is capable of being manufactured by mass production methods at relatively low cost and one which can be sold to the trade at a reasonable price; as well as one which is inexpensive to operate due to the substantial reduction in breakage of the liquid containing receptacles.

Another object of the invention is to provide a liquid spraying or distributing device of the foregoing character having means for regulating the amount of suction or vacuum applied to the fertilizing liquid so as to predetermine the amount of such fertilizing liquid or solution discharged into the water stream.

Another object of the invention is to provide a fertilizer distributing device which is capable of being directly attached to a standard water faucet or outlet and which may likewise be located at a point remote from the source of water supply and interposed between a pair of hose lines.

The above and other objects and advantages of the invention will appear from the following description and appended claims when considered in conjunction with the drawing accompanying the present application wherein like reference characters designate corresponding parts in the several views.

In said drawing:

Fig. 1 is an elevational view, partly broken away, of a device or apparatus embodying the present invention.

Fig. 2 is an enlarged fragmentary sectional view, partly in elevation, of the device embodying the invention.

Fig. 3 is an enlarged sectional view through the nozzle or spray head of Fig. 1.

Fig. 4 is a horizontal sectional view taken substantially along the line 4—4 of Fig. 3, looking in the direction of the arrows; and Fig. 5 is a detail sectional view showing a modified form of nozzle or discharge head embodying the invention.

Before explaining in detail the present invention it is to be understood that the invention is not limited in its application to the details of construction and arrangement of parts illustrated in the accompanying drawing, since the invention is capable of other embodiments and of being practiced or carried out in various ways.

Also it is to be understood that the phraseology or terminology employed herein is for the purpose of description and not of limitation, and it is not intended to limit the invention claimed herein beyond the requirements of the prior art.

Referring now particularly to Figs. 1 to 4 inclusive, 10 represents a receptacle for containing liquid which, as shown, is in the form of a glass jar having a neck portion provided with an external rib or bead 10a. A cap or cover member 11 which may be formed of molded resilient rubber or other flexible and elastic material is applied to the neck of the jar. The cap or cover has a skirt or depending flange portion 11a which is clamped to the jar neck by a metal band 12 provided at its free ends with a clamping device 13. The closure flange 11a is provided with a groove 14 which is adapted to receive the rib 10a of the jar neck. The cap has a slip fit with the jar neck and when the band 12 is tightened, the rubber depending flange 11a is held in intimate engagement with the rib or bead 10a. One side of a portion of the cover or closure member has an externally threaded coupling or connection 15 for receiving a water hose 16 from a source of water supply such, for example, as the faucet or tap 9 of Fig. 1. The cap or cover likewise has an externally threaded connection 16a opposite to the water hose or conduit 16 and which is adapted to receive a hose line 17. The cap or closure 11 has an enlarged horizontal raised portion 18 providing a passageway 19 which is closed except for a hole or opening 20 formed in the bottom wall thereof adjacent the inlet connection 16. The diaphragm or wall portion 18a of the cover is provided with a substantially centrally disposed depending boss or projection 21 having an angularly disposed or inclined opening therethrough to receive the upper end of a suction tube 22. It will be seen, Fig. 2, that the upper end of the tube 22 is bent to provide a portion 23 which extends lengthwise of the passage 19 and is directed toward the fitting or connection 16a at the outlet or discharge side of the receptacle. The portion 23 when so placed acts to hold the tube in place in the cover and also as a Venturi tube. The flow of water past the end 23 of the tube 22 creates a suction in the tube 22 which causes a pressure differential between the interior of said container and the inside of said tube which causes fluid to flow from said container through said tube.

The suction tube 22 is provided with a pair of spaced holes or openings 22a arranged adjacent the upper end of the tube adjacent the boss 21. A sleeve-like valve 24 having a vane or handle 25 is mounted upon the tube and slidable thereon so as to decrease or increase the lifting effect of the suction in the tube on the fluid adjacent the lower end thereof and thus to regulate the amount of fluid to be discharged from the receptacle. By placing said openings as shown adjacent the upper end of the tube, the likelihood of clogging the holes by sediment in the container is eliminated. Also clean top water is constantly withdrawn through said holes and this assists in determining at all times the amount of treating solution remaining in the container.

As seen in Fig. 1 the receptacle of the liquid distributing device is preferably attached directly to the faucee or tap 9 by the coupling or connection 16b. However, a hose line having suitable connections may be interposed between the receptacle cover and faucet or other supply outlet. The hose 17 may be of any desired length and, as shown, is preferably attached to a lance or hollow tube or pipe member 30 having at its upper end a body portion 31 and being connected by a coupling member or the like 32 to the outer end of the hose line 17. The supply of liquid passing from the hose 17 to the supply tube 30 is under the control of a conventional valve which may be operated by the handle 33. The pipe or lance 30 carries at its lower end a spray head or nozzle which is illustrated as a whole at 34, (see also Fig. 3). If desired, however, the lance or spray head may be dispensed with and a conventional lawn or garden spray head or nozzle used to discharge the water and fertilizing solution.

As shown in Fig. 3, the spray head or nozzle 34 is interiorly threaded as at 35 to receive the threaded end 37 of an externally threaded and bored nipple 36, the threaded end 38 of the nipple being engaged with corresponding threads formed in the bore of the tube 30. As shown, the bore of the head 34 extends at an angle to the vertical and opens into the cavity or space 39 in the head 34. The lower end of the head or body 34 is externally threaded at 40 to receive a knurled ring 41 having an opening 42 within the annularly flanged portion 41a. A disk 43 formed of brass or other suitable metal rests upon the flange 41a and a rubber washer 45 is applied above the disk. As shown, the disk 43 is provided with a central perforation or hole 44 through which the liquid is forced. Next to the rubber washer or gasket 45 there is located a disk 46 formed of brass or other suitable metal which is pressed or struck-up at diametrically opposite points to provide reversely directed passages 46a leading from the upper side of the disk to the disk 43. The purpose of the passages 46a is to direct the liquid in tangential directions toward the central opening or hole 44 in the disk 43. A cup-shaped screen 47 is located above the disk 46 and serves to collect within the space or channel 39 any solid particles that might enter the liquid stream and thus prevents any possibility of choking or clogging the discharge orifice 44.

The tube or pipe 30 and the body portion 31 of the valve casing serve as handle means for manipulating the spray nozzle or head and by reason of the length of the feed tube 30 the liquid or spray solution may be applied directly to objects otherwise not within the reach of the operator.

Referring now particularly to Fig. 5, a somewhat modified form of nozzle or spray head is illustrated. In this form of the invention the tube 30 is interiorly threaded to receive the threaded inner end 52 of a spray tip or nozzle shown as a whole at 50. The lower end of the spray head is pointed at 51 so that the head is capable of penetrating the ground to points below the top surface thereof. The head 50 is provided with a longitudinal passageway 53 and with lateral passages or outlet orifices 54. Thus when the head is forced into the ground the lateral or transverse passages or orifices 54 will not be choked or clogged with the soil particles. Thus the liquid such as fertilizing solution may be discharged at points directly adjacent the roots of plants and the like.

The operation of the device of Figs. 1 to 4 inclusive is substantially as follows. Water from the tap 9 and hose line 16 is forced into the jar or receptacle 10 and follows the path of the arrows indicated in Fig. 2. The pressure of the water on the fertilizer solution within the container, that is, in the bottom of the jar 10, together with the suction created by the flow of water through passage 19 past the open end of the tube portion 23, draws a predetermined amount of the fertilizing solution into the tube portion 22 and admixes it with the water stream for discharge therewith. By moving the slidable vane 24, 25 over the holes 22a in the tube, some of the suction effect may be by-passed in such a way that only a predetermined amount of the solution will be drawn into the tube from the bottom of the jar. Thus the size of the tube 22 together with the adjustment of the vane 24 will definitely regulate the amount of fertilizing or other solution which is fed into the main stream.

By use of the molded rubber cap or cover 11 excess water pressures within the jar will be relieved by virtue of the fact that the cap or closure will expand, thus eliminating a considerable amount of breakage of jars such as has attended jars using metal or plastic caps of rigid construction. It is to be understood that the resilient closure member or cap of the device acts as a pressure regulating member only when the water is passing or running through the device. Thus the present device functions chiefly to regulate and smooth out the surges in the device due to variations in water pressure.

Since the tube 22 is readily removable from the cap, it will be seen that the present construction permits the use of various sizes of interchangeable tubes to accommodate various types of solutions to be distributed by the device.

The solution from the passageway 19 passes into the valve housing 31, past the valve located therein (but not shown in the drawing) and through the tube 30 to the spray head or nozzle 34 from which the solution is discharged. The solution has to pass through the strainer screen 47 into the arcuate passages 46a formed in the disk 46 from which passages it passes in tangential directions toward the discharge opening or aperture 44 formed in the disk 43. This action of the solution and the control of its movement produces a fine spray which is widely distributed and which is under relatively high pressure.

When the modified spray head or tap 50 of Fig. 5 it attached to the lance or tube 30, the liquid is discharged through the lateral passages or outlet orifices 54 under pressure and the discharge liquid may flow into the ground adjacent the roots of the plants or the like to be fertilized.

I claim:

1. A device for admixing liquid solutions prior to their distribution comprising a receptacle, a closure for said receptacle formed of flexible and elastic material, said closure having a tube-like compartment of substantially smaller area than the area of the closure formed therein and extending substantially horizontally thereof, a water supply conduit leading into one end of said compartment, said compartment having an opening communicating with the interior of said receptacle, a metal tube depending from said closure and extending into the receptacle to a point adjacent the bottom thereof, said tube having a portion extending upwardly into said compartment and directed toward the outlet end thereof, and a delivery conduit connected to said outlet end.

2. A device for admixing liquid solutions, comprising a receptacle, a closure for said receptacle formed of flexible and elastic material, said closure having a tube-like compartment of substantially smaller area than the area of the closure formed therein and extending substantially horizontally thereof, a water supply conduit leading into one end of said compartment, said compartment having an opening communicating with the interior of said receptacle, a detachable and interchangeable metal tube depending from said closure and extending into the receptacle to a point adjacent the bottom thereof, said tube having a portion extending upwardly into said compartment and directed toward the outlet end thereof, and a delivery conduit connected to said outlet end.

3. A device for admixing liquid solutions comprising a receptacle, a closure for said receptacle formed of flexible and elastic material, said closure having a tube-like compartment of substantially smaller area than the area of the closure formed therein and extending substantially horizontally thereof, a water supply conduit leading into one end of said compartment, said compartment having an opening communicating with the interior of said receptacle, a metal tube depending from said closure and extending into the receptacle to a point adjacent the bottom thereof, said tube having a portion extending upwardly into said compartment and directed toward the outlet end thereof, a delivery conduit connected to said outlet end, and adjustable means for regulating the amount of liquid drawn into said tube from said receptacle.

4. A device for admixing liquid solutions comprising a receptacle, a closure for said receptacle formed of molded resilient rubber, said closure having a tube-like compartment of substantially smaller area than the area of the closure formed therein and extending substantially horizontally thereof, a water supply conduit leading into one end of said compartment, said compartment having an opening communicating with the interior of said receptacle, a metal tube depending from said closure and extending into the receptacle to a point adjacent the bottom thereof, said tube having a portion extending upwardly into said compartment and directed toward the outlet end thereof, a delivery conduit connected to said outlet end, and means for regulating the amount of liquid drawn into said tube from said receptacle, said means comprising a valve member slidable on said metal tube within the receptacle and said tube having a plurality of valve ports formed therein and adapted to be covered and uncovered by said valve member, said member having a handle portion projecting therefrom.

5. A device for admixing and distributing liquid solutions comprising a transparent and frangible receptacle, a closure for said receptacle formed of molded resilient rubber, said closure having a tube-like compartment of substantially smaller area than the area of the closure formed therein and extending substantially horizontally thereof, a water supply conduit leading into one end of said compartment, said compartment having an opening communicating with the interior of said receptacle, a metal tube depending from said closure and extending into the receptacle to a point adjacent the bottoms thereof, said tube having a portion extending upwardly into said compartment and directed toward the outlet end thereof, a delivery conduit connected to said outlet end, and adjustable means for regulating the amount of liquid drawn into said tube from said receptacle, said regulating means comprising openings through a wall of the tube within the receptacle and a sleeve like valve for covering and uncovering said openings.

6. A device for admixing liquid solutions prior to their distribution, comprising a receptacle having a neck portion, a closure for said receptacle formed of flexible and elastic material having a depending flange fitting over said neck portion, an adjustable metal band engaging said flange for securing the closure to the neck portion of the receptacle, said closure having a tube-like compartment of substantially smaller area than the area of the closure formed therein and extending substantially horizontally thereof, a water supply conduit leading into one end of said compartment, said compartment having an opening communicating with the interior of said receptacle, a metal tube depending from said closure and extending into the receptacle to a point adjacent the bottom thereof, said tube having a portion extending upwardly into said compartment and directed toward the outlet end thereof, and a delivery conduit connected to said outlet end.

EDWIN PETERSON.